United States Patent
Singh et al.

(10) Patent No.: US 11,388,140 B1
(45) Date of Patent: *Jul. 12, 2022

(54) APPARATUS, SYSTEM, AND METHOD FOR APPLYING FIREWALL RULES AT DYNAMIC OFFSETS WITHIN PACKETS IN KERNEL SPACE

(71) Applicant: Juniper Networks, Inc., Sunnyvale, CA (US)

(72) Inventors: Prashant Singh, Santa Clara, CA (US); Sreekanth Rupavatharam, Campbell, CA (US); Hariprasad Shanmugam, Kanata (CA); Erin MacNeil, Carp (CA)

(73) Assignee: Juniper Networks, Inc, Sunnyvale, CA (US)

( * ) Notice: Subject to any disclaimer, the term of this patent is extended or adjusted under 35 U.S.C. 154(b) by 183 days.

This patent is subject to a terminal disclaimer.

(21) Appl. No.: 16/940,425

(22) Filed: Jul. 28, 2020

Related U.S. Application Data

(63) Continuation of application No. 15/726,718, filed on Oct. 6, 2017, now Pat. No. 10,798,059.

(51) Int. Cl.
  *H04L 9/40* (2022.01)
  *H04L 69/22* (2022.01)
  *H04L 69/329* (2022.01)

(52) U.S. Cl.
  CPC ........ *H04L 63/0236* (2013.01); *H04L 63/029* (2013.01); *H04L 69/22* (2013.01); *H04L 69/329* (2013.01)

(58) Field of Classification Search
  CPC ... H04L 63/0236; H04L 63/029; H04L 69/22; H04L 69/329
  See application file for complete search history.

(56) References Cited

U.S. PATENT DOCUMENTS

| 10,038,572 | B1 ‡ | 7/2018 | Seshadri | H04L 12/4633 |
| 2009/0144819 | A1 * | 6/2009 | Babbar | H04L 63/164 726/13 |
| 2016/0337104 | A1 ‡ | 11/2016 | Kalligudd | H04W 76/10 |

(Continued)

OTHER PUBLICATIONS

Non-Final Office Action received for U.S. Appl. No. 15/726,718 dated Jul. 23, 2019, 26 pages.

(Continued)

*Primary Examiner* — Huan V Doan
(74) *Attorney, Agent, or Firm* — FisherBroyles, LLP

(57) ABSTRACT

A disclosed method may include (1) receiving a packet at a tunnel driver in kernel space on a routing engine of a network device, (2) identifying, at the tunnel driver, metadata of the packet that indicates whether at least one firewall filter had already been correctly applied to the packet before the packet arrived at the tunnel driver, (3) determining, based at least in part on the metadata of the packet, that the firewall filter had not been correctly applied to the packet before the packet arrived at the tunnel driver, and then in response to determining that the firewall filter had not been correctly applied to the packet, (4) invoking at least one firewall filter hook that applies at least one firewall rule on the packet before the packet is allowed to exit kernel space on the routing engine. Various other apparatuses, systems, and methods are also disclosed.

20 Claims, 7 Drawing Sheets

(56) References Cited

U.S. PATENT DOCUMENTS

2017/0064343 A1‡ 3/2017 Tsukagoshi ........ H04N 21/2381
2017/0230287 A1* 8/2017 Hall ........................ H04L 69/22
2018/0337887 A1‡ 11/2018 Aluvala ................ H04L 63/029

OTHER PUBLICATIONS

Final Office Action received for U.S. Appl. No. 15/726,718 dated Dec. 12, 2019, 29 pages.
Notice of Allowance received for U.S. Appl. No. 15/726,718 dated Jun. 25, 2020, 33 pages.

\* cited by examiner
‡ imported from a related application

APPARATUS, SYSTEM, AND METHOD FOR APPLYING FIREWALL RULES AT DYNAMIC OFFSETS WITHIN PACKETS IN KERNEL SPACE

CROSS REFERENCE TO RELATED APPLICATION

This application is a continuation of U.S. application Ser. No. 15/726,718 filed 6 Oct. 2017, the disclosure of which is incorporated, in its entirety, by this reference.

BACKGROUND

Network devices often apply firewall filters on incoming and/or outgoing traffic. For efficiency reasons, some network devices may apply such firewall filters on traffic in kernel space, as opposed to user space, on routing engines. This application of firewall filters may prevent some unwanted incoming packets from reaching user space on the corresponding routing engine. In addition, this application of firewall filters may prevent some unwanted outgoing packets from reaching the corresponding packet forwarding engine.

Unfortunately, due to certain deficiencies in traditional firewall filters, some packets may evade and/or bypass such firewall filters in kernel space, thereby potentially enabling unwanted and/or malicious traffic to reach its destination. This bypassing of unwanted and/or malicious traffic may put the network device (or the corresponding network) at risk of intrusion and/or infection. This bypassing of unwanted and/or malicious traffic may also cause the network device to perform less efficiently as a result of unnecessary bandwidth and/or resource consumption.

As a specific example, an application in user space may generate a packet that includes both a Layer 2 (L2) header and a Layer 3 (L3) header. Such a packet is sometimes referred to as an L2 inject. For example, a LINUX operating system may use the "AF_PACKET" feature and/or socket family for an L2 inject packet. In this example, the L3 header may be offset within the packet due at least in part to the injection by the application of the L2 header. In other words, the L3 header may be located and/or positioned after the L2 header within the packet. As a result of the L3 header's offset location and/or position within the packet, the L3 header may evade and/or bypass the regular firewall filter hooks in kernel space. Moreover, even in the event that the packet hits the regular firewall filter hooks in kernel space, the L3 header's offset location and/or position within the packet may cause the corresponding firewall rules to be applied to the packet incorrectly (e.g., at the wrong location).

The instant disclosure, therefore, identifies and addresses a need for additional and improved apparatuses, systems, and methods for applying firewall rules at dynamic offsets within packets in kernel space.

SUMMARY

As will be described in greater detail below, the instant disclosure generally relates to apparatuses, systems, and methods for applying firewall rules at dynamic offsets within packets in kernel space. In one example, a method for accomplishing such a task may include (1) receiving a packet at a tunnel driver in kernel space on a routing engine of a network device, (2) identifying, at the tunnel driver, metadata of the packet that indicates whether at least one firewall filter had already been correctly applied to the packet before the packet arrived at the tunnel driver, (3) determining, based at least in part on the metadata of the packet, that the firewall filter had not been correctly applied to the packet before the packet arrived at the tunnel driver, and then in response to determining that the firewall filter had not been correctly applied to the packet, (4) invoking at least one firewall filter hook that applies at least one firewall rule to the packet in kernel space on the routing engine before the packet is allowed to exit kernel space on the routing engine.

Similarly, a physical routing engine that implements the above-described method may include a tunnel driver, stored in kernel space, that (1) receives a packet in kernel space, (2) identifies metadata of the packet that indicates whether at least one firewall filter had already been correctly applied to the packet before the packet arrived at the tunnel driver, (3) determines, based at least in part on the metadata of the packet, that the firewall filter had not been correctly applied to the packet before the packet arrived at the tunnel driver, and then in response to determining that the firewall filter had not been correctly applied to the packet, (4) invokes at least one firewall filter hook that applies at least one firewall rule to the packet in kernel space on the physical routing engine before the packet is allowed to exit kernel space on the physical routing engine. The physical routing engine may also include at least one physical processing device that executes the tunnel driver in kernel space.

In addition, a network device that implements the above-described method may include a physical routing engine. In this example, the physical routing engine may include a tunnel driver, stored in kernel space, that (1) receives a packet in kernel space, (2) identifies metadata of the packet that indicates whether at least one firewall filter had already been correctly applied to the packet before the packet arrived at the tunnel driver, (3) determines, based at least in part on the metadata of the packet, that the firewall filter had not been correctly applied to the packet before the packet arrived at the tunnel driver, and then in response to determining that the firewall filter had not been correctly applied to the packet, (4) invokes at least one firewall filter hook that applies at least one firewall rule to the packet in kernel space on the physical routing engine before the packet is allowed to exit kernel space on the physical routing engine. The physical routing engine may also include a physical packet forwarding engine that receives the packet from a remote device and/or is capable of forwarding the packet to a remote device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
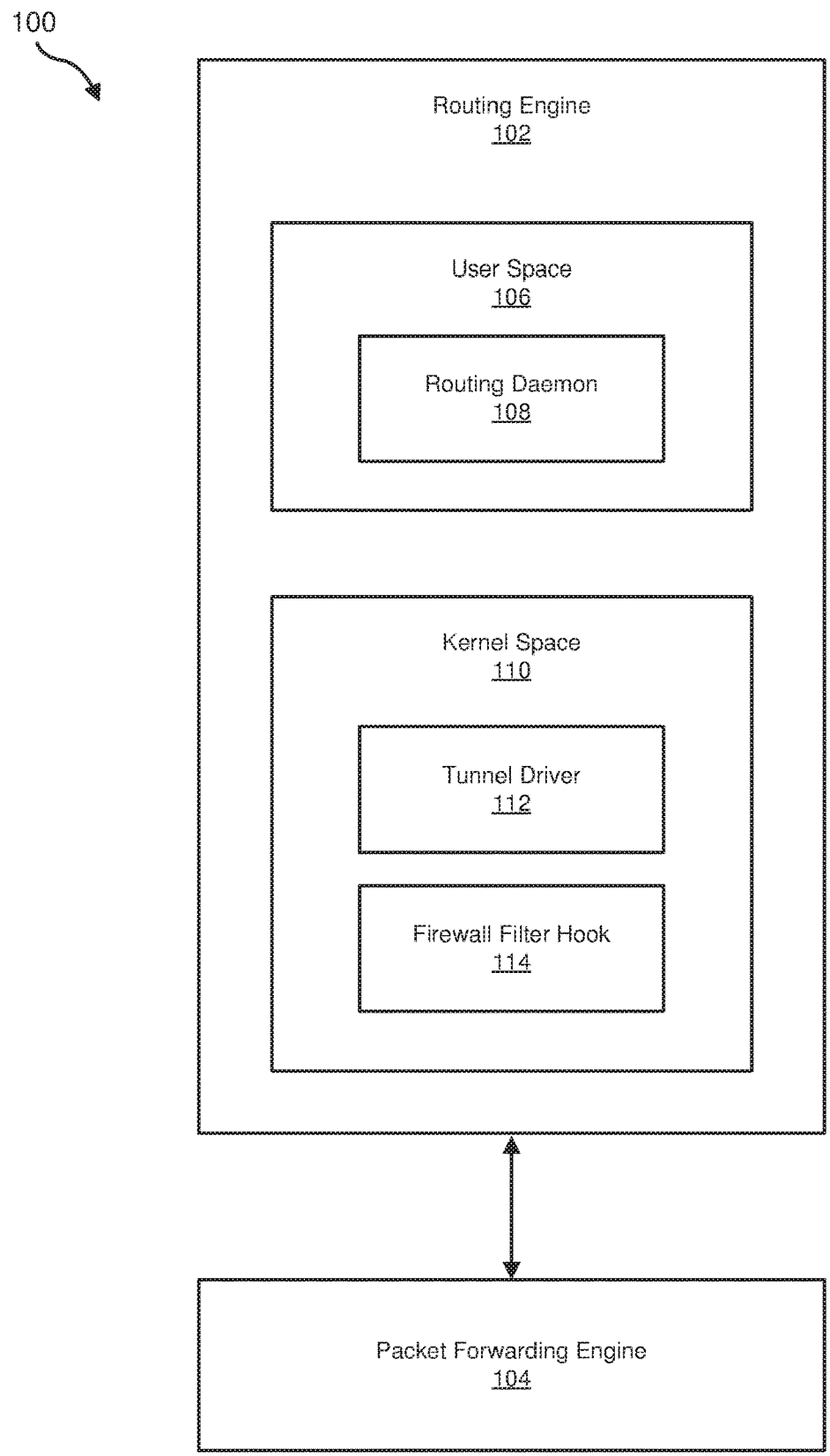
FIG. 1 is a block diagram of an exemplary apparatus for applying firewall rules at dynamic offsets within packets in kernel space.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for applying firewall rules at dynamic offsets within packets in kernel space. As will be explained in greater detail below, embodiments of the instant disclosure may enable network devices to apply firewall rules in kernel space. For example, embodiments of the instant disclosure may include and/or involve an application that runs in user space on a routing engine of a network device. In this example, the application may generate an L2 inject packet that is destined for a remote device. This L2 inject packet may include both an L2 header (sometimes also referred to as an Ethernet header) and an L3 header (sometimes also referred to as an Internet Protocol (IP) header).

In the event that the application is aware of the L3 header's offset within the L2 inject packet, the application may insert offset information that identifies the offset of the L3 header within a control message of the L2 inject packet. However, in the event that the application is unaware of the L3 header's offset within the L2 inject packet, the application may simply initiate a send call for the packet. After initiation of the send call, a socket-intercept layer may intercept the send call in kernel space on the routing engine and then query a routing daemon in user space for the offset information that identifies the offset of the L3 header within the L2 inject packet. Upon obtaining the offset information, the socket-intercept layer may record the offset information within a control message of the L2 inject packet and then pass the L2 inject packet down the network stack of communications protocols in kernel space.

As the L2 inject packet traverses the network stack, a kernel-mode hook may capture the L2 inject packet. This kernel-mode hook may copy the offset information from the control message to a socket buffer field of the L2 inject packet and then pass the L2 inject packet further down the network stack in kernel space. While further traversing the network stack, the L2 inject packet may arrive at a tunnel driver in kernel space. The tunnel driver may examine the metadata of the L2 inject packet to determine whether the L2 inject packet has been properly subjected to applicable firewall rules.

For example, the tunnel driver may identify the offset information in the socket buffer field of the L2 inject packet and/or other metadata that indicates the packet type of the L2 inject packet. The tunnel driver may then determine that the L2 inject packet evaded and/or bypassed certain firewall filters and/or rules in kernel space based at least in part on the offset information and/or the packet type. In response to this determination, the tunnel driver may invoke one or more firewall filter hooks to apply those firewall filters and/or rules on the L2 inject packet. The tunnel driver may also adjust the L3 header within the packet so that the firewall filters and/or rules are applied on the L3 header at the correct offset. By doing so, the tunnel driver may ensure that the L2 inject packet is properly screened by subjecting the L2 inject packet to those firewall filters and/or rules correctly before the L2 inject packet is allowed to exit kernel space on its way toward the remote device.

As another example, embodiments of the instant disclosure may involve and/or include a packet forwarding engine of a network device. In this example, the packet forwarding engine may receive an incoming packet from a remote device. The incoming packet may be destined for an application that is running in user space on the routing engine of the network device. The packet forwarding engine may store certain packet-specific information within a tunnel header of the packet. This packet-specific information may identify an offset of the L3 header within the packet and/or a packet type of the packet.

Upon storing this packet-specific information within the tunnel header, the packet forwarding engine may forward the packet to the routing engine of the network device. At the routing engine, the packet may reach the tunnel driver in kernel space. The tunnel driver may search the tunnel header of the packet for the packet-specific information and then determine that the packet evaded and/or bypassed certain firewall filters and/or rules in kernel space based at least in part on the packet-specific information.

In response to this determination, the tunnel driver may invoke one or more firewall filter hooks to apply those firewall filters and/or rules on the packet. The tunnel driver may also adjust the L3 header within the packet so that the firewall filters and/or rules are applied on the L3 header at the correct offset. By doing so, the tunnel driver may ensure that the incoming packet is properly screened by subjecting the packet to those firewall filters and/or rules correctly before the packet is allowed to exit kernel space on its way toward the application in user space.

In these ways, embodiments of the instant disclosure may prevent unwanted and/or malicious traffic from reaching its destination, thereby increasing and/or bolstering the security of the network device and the corresponding network and/or reducing the risk of intrusion and/or infection. Embodiments of the instant disclosure may also increase and/or improve the performance of the network device and/or the corresponding network by mitigating unnecessary bandwidth and/or resource consumption.

The following will provide, with reference to FIG. 1, examples of apparatuses and corresponding components that facilitate applying firewall rules at dynamic offsets within packets in kernel space. The discussions corresponding to FIGS. 2 and 4 will describe exemplary implementations of apparatuses that facilitate applying firewall rules at dynamic offsets within packets in kernel space. The discussions corresponding to FIGS. 5 and 6 will describe exemplary journeys of an egress packet and an ingress packet, respectively. Finally, the discussion corresponding to FIG. 7 will provide numerous examples of systems and/or devices that may incorporate the apparatus from FIG. 1.

FIG. 1 shows an exemplary apparatus 100 that facilitates applying firewall rules at dynamic offsets within packets in kernel space. As illustrated in FIG. 1, apparatus 100 may include and/or represent a routing engine 102 and a packet forwarding engine 104 in communication with one another. In this example, routing engine 102 may include a routing daemon 108 running in user space 106. Additionally or alternatively, routing engine 102 may include a tunnel driver 112 and a firewall filter hook 114 that are stored and/or executed in kernel space 110.

Routing engine 102 generally represents and/or refers to a physical device and/or hardware that handles routing procedures, processes, and/or decisions. Routing engine 102 may include one or more Application-Specific Integrated Circuits (ASICs) and/or physical processors. Examples of such processors include, without limitation, microprocessors, microcontrollers, Central Processing Units (CPUs), Field-Programmable Gate Arrays (FPGAs) that implement softcore processors, portions of one or more of the same, variations or combinations of one or more of the same, and/or any other suitable physical processors.

In one example, routing engine 102 may control certain physical and/or virtual interfaces of a network device. In addition, routing engine 102 may include an operating system and/or certain applications that facilitate communication between the network device and other devices within a network.

Packet forwarding engine 104 generally represents and/or refers to a physical device and/or hardware that processes packets by forwarding the same between input and output interfaces. Packet forwarding engine 104 may include one or more ASICs and/or physical processors. Examples of such processors include, without limitation, microprocessors, microcontrollers, CPUs, FPGAs that implement softcore processors, portions of one or more of the same, variations or combinations of one or more of the same, and/or any other suitable physical processors.

In one example, packet forwarding engine 104 may include one or more egress interfaces (not explicitly illustrated in FIG. 1) out of which packets egress from the network device to the other devices within the network. Additionally or alternatively, packet forwarding engine 104 may include one or more ingress interfaces (not explicitly illustrated in FIG. 1) into which packets ingress to the network device from the other devices within the network.

In one example, routing engine 102 and packet forwarding engine 104 may be communicatively coupled and/or connected to one another via an interface that is internal to the network device. Accordingly, apparatus 100 may represent a portion of and/or be included in the network device. However, the network device may also include various other components in addition to and/or beyond those represented as and/or included in apparatus 100.

The term "user space," as used herein, generally refers to any type or form of memory and/or address space that has been designated for and/or allocated to application software and/or components. The term "kernel space," as used herein, generally refers to any type or form of memory and/or address space that has been designated for and/or allocated to an operating system kernel and/or operating system components. In one example, user space 106 and kernel space 110 may include and/or represent mutually exclusive virtual memory allocations and/or execution contexts that are separate and/or segregated from one another.

Routing daemon 108 generally represents and/or refers to a program, module, and/or component that manages and/or maintains certain state of a network device. In one example, routing daemon 108 may manage and/or maintain information that identifies and/or specifies the offsets of certain headers (such as L3 or IP headers) within packets originating from user space 106. Additionally or alternatively, routing daemon 108 may manage and/or maintain information that identifies and/or specifies the packet types of certain packets originating from user space 106. For example, routing daemon 108 may subscribe to offset information that identifies and/or specifies the offset of each packet generated by an application in user space and/or packet-type information that identifies and/or specifies a particular packet type of each packet generated by the application in user space.

Tunnel driver 112 generally represents and/or refers to a program, module, component, and/or driver that facilitates the establishment of communication sockets between local applications in user space and remote applications on remote devices. In some examples, tunnel driver 112 may be stored and/or executed in kernel space on a routing engine. In one example, an application in user space may bind to tunnel driver 112 such that traffic originating from the application is tunneled and/or channeled through tunnel driver 112 before exiting kernel space on the routing device.

Firewall filter hook 114 generally represents and/or refers to a program, module, component, and/or code that hooks, captures, and/or intercepts packets and/or function calls. In one example, firewall filter hook 114 may include and/or represent a modification and/or augmentation to an operating system, Application Programing Interface (API), and/or network stack of communications protocols. In this example, firewall filter hook 114 may at least temporarily transfer the flow of execution from a certain execution path or stack to another memory location and/or alternative code. For example, firewall filter hook 114 may include and/or represent code (e.g., a jump instruction) inserted at the beginning or entry point of an operating system function and/or a network stack. In this example, the code (sometimes referred to as a "trampoline") may temporarily transfer or divert the flow of execution from the operating system function or network stack to another memory location where additional code is configured to inspect and/or analyze an incoming or outgoing packet by applying firewall rules.

Figure 2:
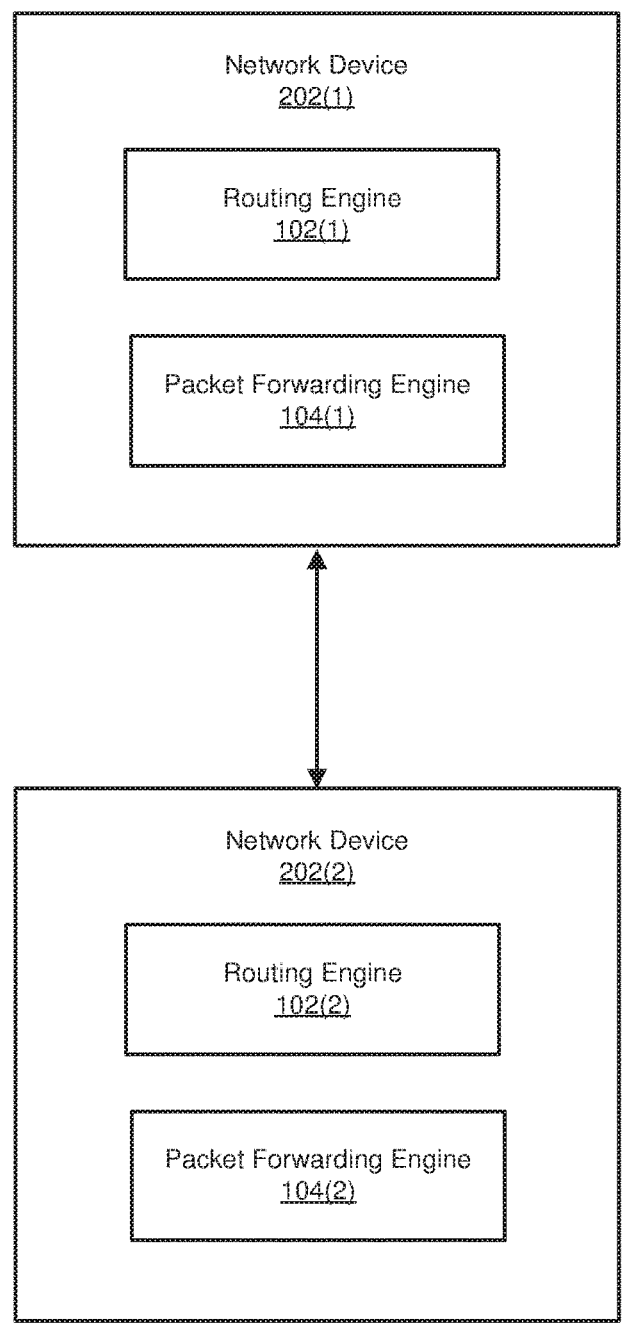
FIG. 2 is a block diagram of an exemplary implementation of an apparatus for applying firewall rules at dynamic offsets within packets in kernel space.

Apparatus 100 in FIG. 1 may be implemented in a variety of ways. For example, all or a portion of apparatus 100 may represent portions of exemplary implementation 200 in FIG. 2. As illustrated in FIG. 2, implementation 200 may include and/or represent network devices 202(1) and 202(2) in communication with one another. In this example, network device 202(1) may include routing engine 102(1) and packet forwarding engine 104(1) in communication with one another via an internal interface (not explicitly illustrated in FIG. 2). In addition, network device 202(2) may include routing engine 102(2) and packet forwarding engine 104(2) in communication with one another via an internal interface (not explicitly illustrated in FIG. 2).

Network devices 202(1) and 202(2) each generally represent a physical computing device that forwards traffic within a network and/or across networks. In one example, one or more of network devices 202(1) and 202(2) may include and/or represent a router, such as a Customer Edge (CE) router, a Provider Edge (PE) router, a hub router, a spoke router, an Autonomous System (AS) boundary router, and/or an area border router. Additional examples of network devices 202(1) and 202(2) include, without limitation, switches, hubs, modems, bridges, repeaters, gateways, portions of one or more of the same, combinations or variations of one or more of the same, and/or any other suitable network devices. Although FIG. 2 illustrates only two network devices, other embodiments may involve and/or incorporate various additional network devices.

In some examples, network devices 202(1) and 202(2) may be directly linked to one another such that they each represent the next hop of the other. In other examples, network devices 202(1) and 202(2) may be separated from one another by one or more intermediary devices (not illustrated in FIG. 2). In other words, intermediary devices may reside between network devices 202(1) and 202(2) and/or facilitate communication between network devices 202(1) and 202(2). Accordingly, implementation 200 may include additional network devices and/or components that are not necessarily illustrated in FIG. 2.

Figure 3:
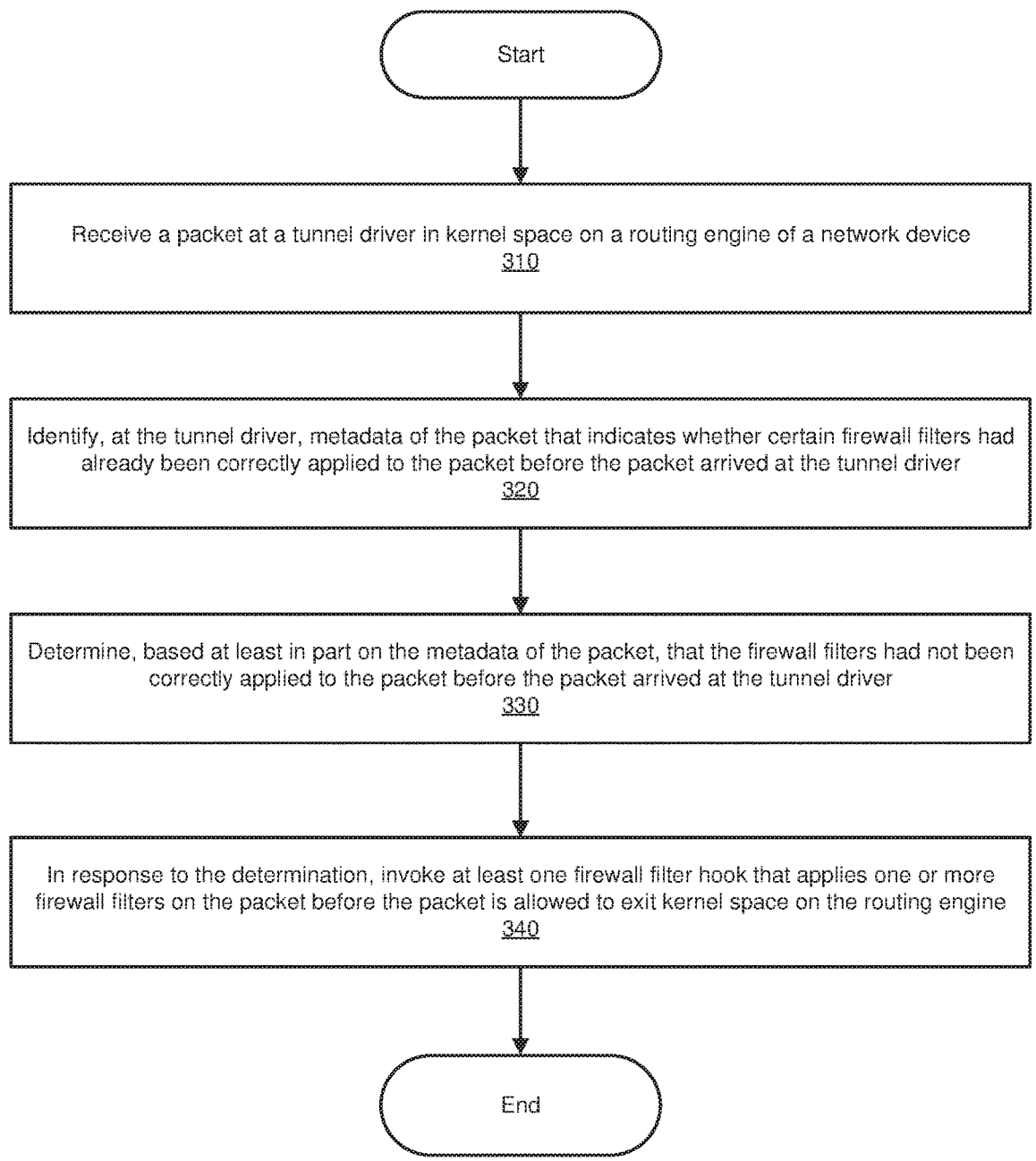
FIG. 3 is a flow diagram of an exemplary method for applying firewall rules at dynamic offsets within packets in kernel space.

FIG. 3 is a flow diagram of an exemplary computer-implemented method 300 for applying firewall rules on packets in kernel space on network devices. The steps shown in FIG. 3 may be performed by any suitable computer-executable code, computing system, and/or ASIC, including apparatus 100 in FIG. 1, implementation 200 in FIG. 2, exemplary implementation 400 in FIG. 4, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may receive a packet at a tunnel driver in kernel space on a routing engine of a network device. For example, tunnel driver 112 may, as part of routing engine 102(1) on network device 202(1) in FIG. 2 or 4, receive a packet in kernel space. In one example, the packet may be egressing from network device 202(1) toward network device 202(2). In other words, the packet may have originated from an application in user space on routing engine 102(1) and/or be destined for another application on network device 202(2).

Figure 4:
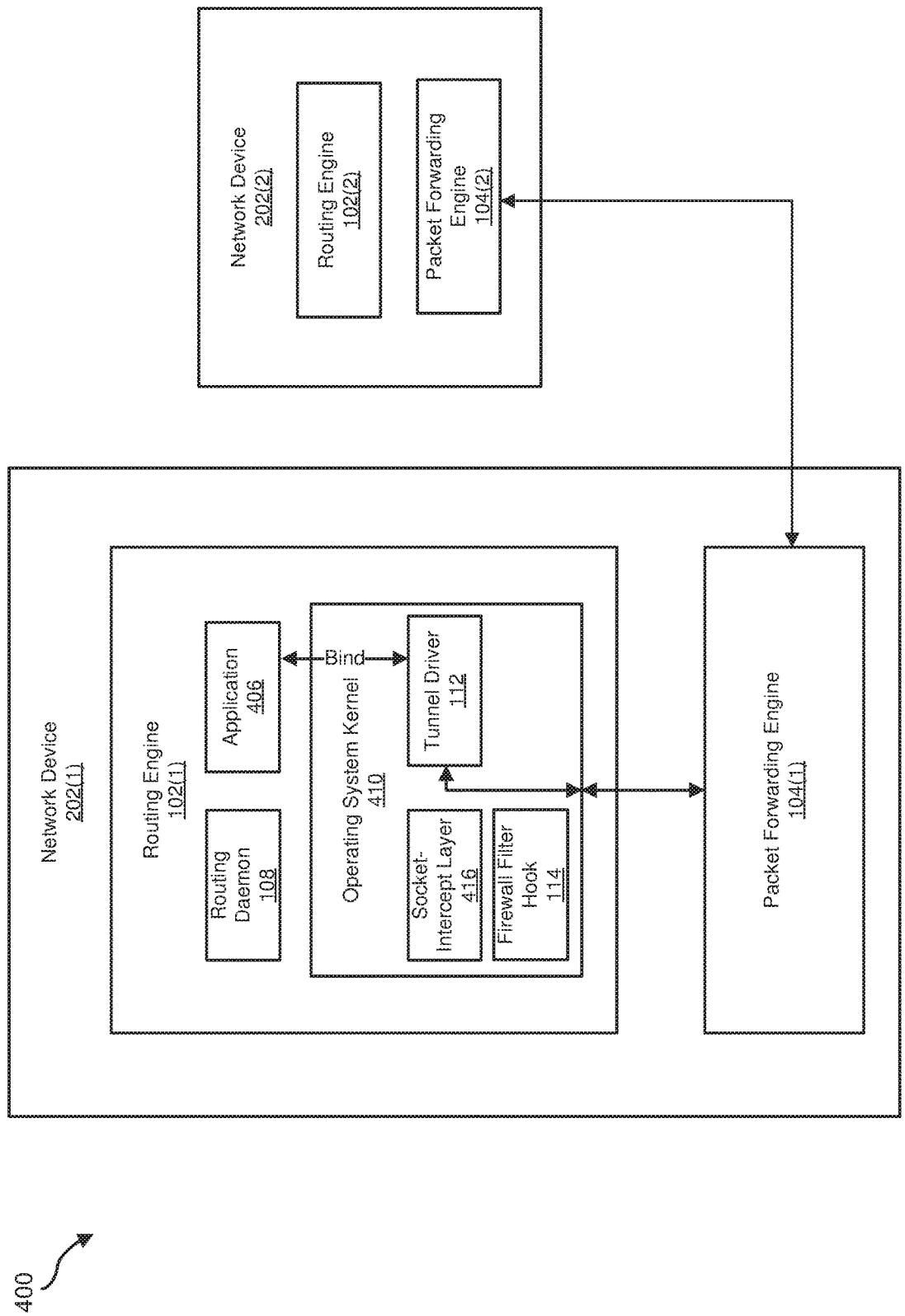
FIG. 4 is a block diagram of an exemplary implementation of an apparatus for applying firewall rules at dynamic offsets within packets in kernel space.

The systems described herein may perform step 310 in a variety of different ways and/or contexts. In some examples, tunnel driver 112 may receive the packet due at least in part to having been bound to the local application associated with the packet. As illustrated in FIG. 4, an application 406 in user space on network device 202(1) may bind to tunnel driver 112 in kernel space on network device 202(1). By binding to tunnel driver 112 in this way, the application may create a network socket that facilitates communication between application 406 and another application on network device 202(2). This network socket may include and/or represent one endpoint of a two-way communication link between applications running on different devices.

Upon creation of the network socket, application 406 may generate a packet and then send the same from user space to kernel space. In other words, application 406 may push and/or pass the packet to an operating system kernel 410 in FIG. 4 on routing engine 102(1) for transmission from network device 202(1) to network device 202(2). In this example, the packet may include and/or represent an L2 inject that is destined for the other application on network device 202(2). Accordingly, the L2 inject packet may include both an Ethernet header and an IP header, and the IP header may be located and/or positioned subsequent to the Ethernet header within the L2 inject packet. As a result, the IP header may be offset to some extent within the L2 inject packet. Operating system kernel 410 may include and/or represent a LINUX operating system that uses the "AF_PACKET" feature and/or socket family to handle the L2 inject packet.

In the event that application 406 is aware of the IP header's offset within the packet, application 406 may insert offset information that identifies the offset of the IP header within a control message header of the packet. This offset information may also identify the packet type of the packet (e.g., an L2 inject packet and/or an Address Family (AF) packet) and/or other IP filtering-related specifics.

However, in the event that application 406 is unaware of the IP header's offset within the packet, application 406 may simply initiate a send call to facilitate transmission of the packet. After initiation of the send call, a socket-intercept layer 416 in FIG. 4 may intercept the send call in kernel space on routing engine 102(1) and then query routing daemon 108 in user space for the offset information that identifies the offset of the IP header within the packet and/or the packet type of the packet. Upon obtaining the offset information from routing daemon 108, socket-intercept layer 416 may record and/or insert the offset information within a control message header of the packet and then pass the packet down the network stack in kernel space.

As the packet traverses the network stack, a kernel-mode hook may capture, intercept, and/or hook the packet. This kernel-mode hook may copy the offset information from the control message to a socket buffer field (sometimes referred to as "skbuff") or mark field of the packet and then pass the packet further down the network stack in kernel space. While further traversing the network stack, the packet may arrive at tunnel driver 112 in kernel space.

Returning to FIG. 3, at step 320 one or more of the systems described herein may identify metadata of the packet that indicates whether at least one firewall filter had already been correctly applied on the packet before the packet arrived at the tunnel driver. For example, tunnel driver 112 may, as part of routing engine 102(1) on network device 202(1) in FIG. 2 or 4, identify metadata of the packet that indicates whether at least one firewall filter had already been correctly applied on the packet before the packet arrived at tunnel driver 112. In this example, the packet's metadata may include headers and/or control messages.

The systems described herein may perform step 320 in a variety of different ways and/or contexts. In some examples, tunnel driver 112 may search the socket buffer field of the packet for the offset information and/or packet type. During this search, tunnel driver 112 may identify the offset information and/or packet type. In these examples, the offset information and/or packet type may indicate to tunnel driver 112 whether the packet has undergone sufficient and/or correct IP firewall filtering. In other words, tunnel driver 112 may use the offset information and/or packet type to determine and/or deduce whether the packet has undergone sufficient and/or correct IP firewall filtering.

Returning to FIG. 3, at step 330 one or more of the systems described herein may determine, based at least in part on the metadata of the packet, that the firewall filter had not been correctly applied to the packet before the packet arrived at the tunnel driver. For example, tunnel driver 112 may, as part of routing engine 102(1) on network device 202(1) in FIG. 2 or 4, determine that the firewall filter had not been correctly applied to the packet before the packet arrived at tunnel driver 112. As will be described in greater detail below, tunnel driver 112 may make and/or arrive at this determination based at least in part on a variety of factors.

To be correctly applied to the packet, the firewall filter may need to apply the firewall rules to the correct locations and/or positions within the packet. Accordingly, in the event that the packet missed the firewall filter hooks altogether, the firewall filter may have failed to apply any firewall rules to the packet. Moreover, in the event that the packet hit the firewall filter hooks but the firewall filter applied certain firewall rules to the packet at the wrong offsets, the firewall filter may have been applied to the packet incorrectly.

The systems described herein may perform step 330 in a variety of different ways and/or contexts. In some examples, tunnel driver 112 may examine the metadata of the packet to determine whether the packet has been properly subjected to applicable firewall rules in kernel space. For example, tunnel driver 112 may identify the packet type of the packet and/or the offset of the IP header based at least in part on the information and/or data included in control message header. In one example, tunnel driver 112 may determine that the firewall filter had not been correctly applied to the packet based solely on the packet type of the packet. In another example, tunnel driver 112 may determine that the firewall filter had not been correctly applied to the packet based solely on the offset of the IP header within the packet. Alternatively, tunnel driver 112 may determine that the firewall filter had not been correctly applied to the packet based on a combination of the packet type and the offset of the IP header.

As a specific example, the packet may be an L2 inject. In this example, tunnel driver 112 may determine that the firewall filter had not been correctly applied to the packet since (1) the firewall filter is never correctly applied to L2 injects and (2) the packet is an L2 inject.

As another specific example, the packet's IP header may be offset beyond a certain threshold. In this example, tunnel driver 112 may determine that the firewall filter had not been correctly applied to the packet since (1) the firewall filter is never correctly applied to packets whose IP header is offset beyond the threshold and (2) the packet's IP header is offset beyond the threshold.

In some examples, tunnel driver 112 may adjust the IP header within the packet so that the firewall filters and/or rules are applied on the IP header at the correct offset. In one example, tunnel driver 112 may temporarily change and/or modify the IP header's location and/or positioning within the packet. For example, tunnel driver 112 may switch the IP header's position with the Ethernet header's position within the packet. Alternatively, tunnel driver 112 may move the IP header's position within the packet by the same number of spaces or bytes as the offset identified in the offset information.

In these ways, tunnel driver 112 may adjust the IP header within the packet to account for the offset. Tunnel driver 112 may make such adjustments to prepare the packet for subsequent IP firewall filtering. By doing so, tunnel driver 112 may ensure that the subsequent IP firewall filtering is performed correctly on the packet.

Returning to FIG. 3, at step 340 one or more of the systems described herein may invoke at least one firewall filter hook that applies at least one firewall rule to the packet in kernel space before the packet is allowed to exit kernel space. For example, tunnel driver 112 may, as part of routing engine 102(1) on network device 202(1) in FIG. 2 or 4, invoke firewall filter hook 114 to apply one or more firewall rules to the packet. In this example, tunnel driver 112 may essentially prevent the packet from proceeding toward its destination unless and until the packet has been properly screened through the firewall rules applied by firewall filter hook 114.

The systems described herein may perform step 340 in a variety of different ways and/or contexts. In some examples, tunnel driver 112 may call firewall filter hook 114 to screen the packet after the packet's IP header has been adjusted to account for the offset. Additionally or alternatively, tunnel driver 112 may pass the packet to firewall filter hook 114 for screening after the packet's IP header has been adjusted to account for the offset. By doing so, tunnel driver 112 may ensure that the firewall filter hook correctly applied the firewall rules on the IP header at the offset.

In one example, this screening of the egress packet may indicate that the packet violates one or more firewall rules. As a result, tunnel driver 112 and/or operating system kernel 410 may drop the packet in kernel space on routing engine 102(1). By doing so, tunnel driver 112 and/or operating system kernel 410 may prevent unwanted and/or malicious egress traffic from reaching its destination, thereby increasing and/or bolstering the security of network device 202(1) and the corresponding network and/or reducing the risk of intrusion and/or infection. By doing so, tunnel driver 112 and/or operating system kernel 410 may also increase and/or improve the performance of network device 202(1) and/or the corresponding network by mitigating unnecessary bandwidth and/or resource consumption.

In the event that the egress packet does not violate any of the firewall rules and/or is not dropped, tunnel driver 112 may undo and/or reverse the adjustment made to the IP header. In one example, tunnel driver 112 may return the IP header to its original, pre-adjustment location and/or position within the packet. For example, once firewall hook 114 has correctly applied the firewall rules to the packet's IP header, tunnel driver 112 may switch the IP header and the Ethernet header back to their original positions within the packet. In another example, tunnel driver 112 may move the IP header's position in the opposite direction by the same number of spaces or bytes as the offset identified in the offset information.

Upon undoing and/or reversing the adjustment to the IP header, tunnel driver 112 may push the packet further down the network stack. In this example, the packet may then traverse from routing engine 102(1) to packet forwarding engine 104(1) via an internal interface. Packet forwarding engine 104(1) may then forward the packet to network device 202(2).

In addition to applying firewall rules to egress packets, embodiments of the instant disclosure may also involve applying firewall rules at dynamic offsets within ingress packets. For example, packet forwarding engine 104(1) may receive a packet that originated from an application on network device 202(2) and/or is destined for application 406 on routing engine 102(1) of network device 202(1). In response to receiving this packet, packet forwarding engine 104(1) may identify certain information about the packet, such as the offset of the IP header within the packet and/or the packet type of the packet. Packet forwarding engine 104(1) may then store such packet-specific information within a tunnel header of the packet.

Upon storing this packet-specific information within the tunnel header, packet forwarding engine 102(1) may forward the packet to routing engine 102(1) of network device 202(1). At routing engine 202(1), the packet may reach tunnel driver 112 in kernel space. Tunnel driver 112 may search the tunnel header of the packet for the packet-specific information and then determine that the packet likely evaded and/or bypassed certain firewall filters and/or rules in kernel space based at least in part on the packet-specific information. Tunnel driver 112 may make and/or arrive at this determination in any of the same ways described above in connection with the egress packet.

In some examples, tunnel driver 112 may then adjust the IP header within the packet to account for the offset identified in the packet-specific information. Tunnel driver 112 may make and/or perform this adjustment in any of the same ways described above in connection with the egress packet.

In some examples, upon adjusting the IP header, tunnel driver 112 may invoke firewall filter hook 114 to correctly apply the firewall rules on the IP header at the offset. Tunnel driver 112 may invoke firewall filter hook 114 in any of the same ways described above in connection with the egress packet.

In one example, this screening of the ingress packet may indicate that the packet violates one or more firewall rules. As a result, tunnel driver 112 and/or operating system kernel 410 may drop the packet in kernel space on routing engine 102(1). By doing so, tunnel driver 112 and/or operating system kernel 410 may prevent unwanted and/or malicious ingress traffic from reaching its destination, thereby increasing and/or bolstering the security of network device 202(1) and the corresponding network and/or reducing the risk of intrusion and/or infection. By doing so, tunnel driver 112 and/or operating system kernel 410 may also increase and/or improve the performance of network device 202(1) and/or the corresponding network by mitigating unnecessary bandwidth and/or resource consumption.

In the event that the ingress packet does not violate any of the firewall rules and/or is not dropped, tunnel driver 112 may undo and/or reverse the adjustment made to the IP header. In one example, tunnel driver 112 may undo and/or reverse the adjustment in any of the same ways described above in connection with the ingress packet.

Upon undoing and/or reversing the adjustment to the IP header, tunnel driver 112 may push the packet up the network stack. In this example, the packet may then traverse from kernel space to application 406 in user space on routing engine 102(1). Application 406 may then consume the packet in any suitable way.

Figure 5:
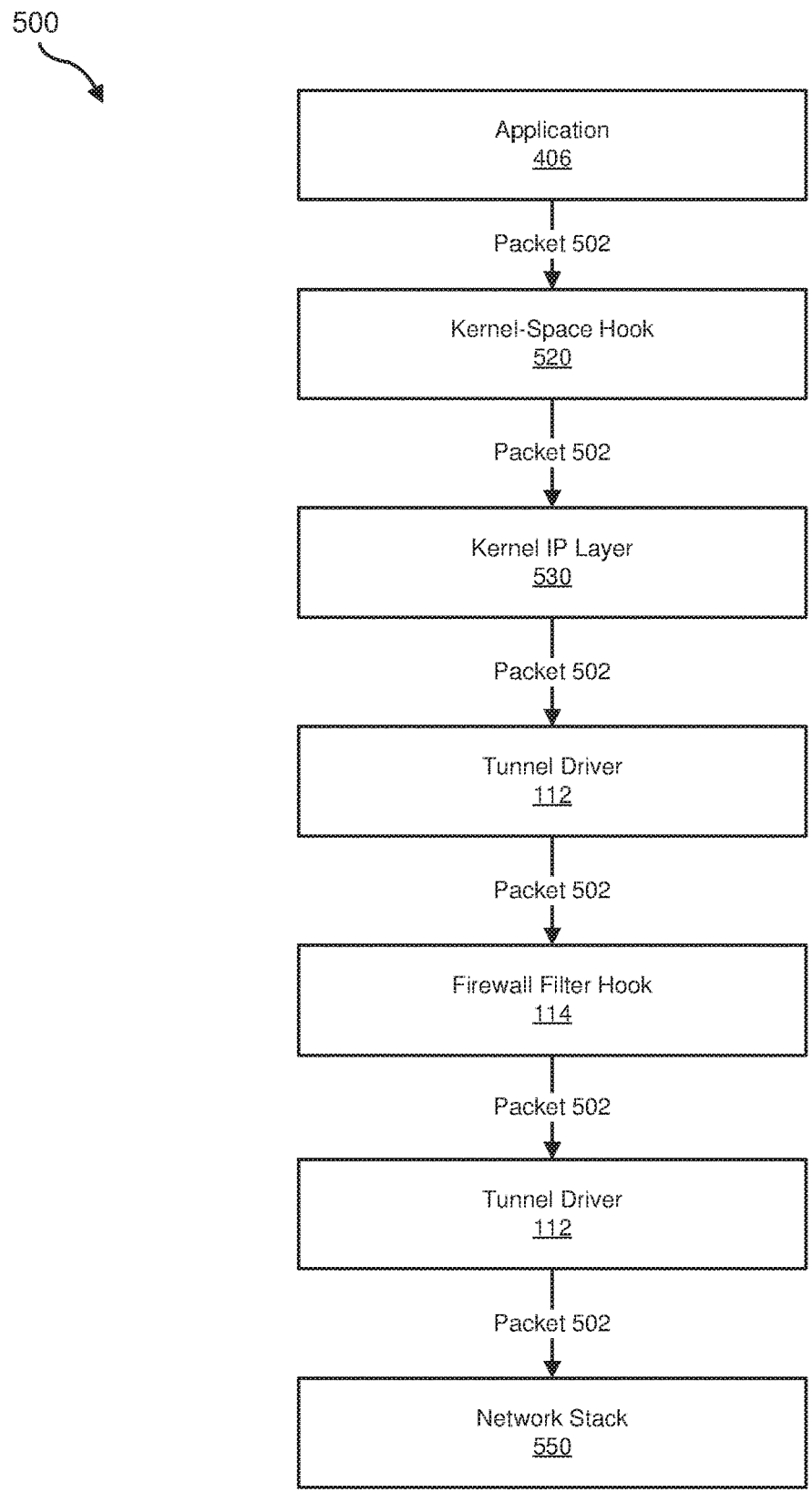
FIG. 5 is an illustration of an exemplary journey of an egress packet that is subjected to firewall rules in kernel space.

FIG. 5 illustrates an exemplary journey 500 of a packet egressing out of network device 202(1). In this example, application 406 may generate a packet 502 in user space on routing engine 102(1) of network device 202(1). Packet 502 may be an L2 inject that includes both L2 and L3 headers. As illustrated in FIG. 4, application 406 may bind and/or be bound to tunnel driver 112. If aware of the L3 header's offset, application 406 may insert offset information that identifies this offset within a control message of packet 502. Application 406 may push, pass, and/or forward packet 502 to kernel space on routing engine 102(1) of network device 202(1). In kernel space, packet 502 may arrive at kernel-mode hook 520 in FIG. 5 that copies the offset information to a socket buffer field of packet 502. If application 406 was unaware of the L3 header's offset, kernel-mode hook 520 may query routing daemon 108 for the offset information.

From kernel-mode hook 520, packet 502 may traverse to a kernel IP layer 530 in FIG. 5 that fails to properly perform IP firewall filtering on packet 502 due at least in part to the offset and/or packet type. Packet 502 may then traverse to tunnel driver 112, which searches for the IP header's offset and/or the packet type of packet 502 within the socket buffer field. Tunnel driver 112 may then adjust the IP header to account for the offset. Upon completion of the adjustment, tunnel driver 112 may call firewall filter hook 114 to apply the firewall rules on the IP header correctly.

Continuing with this example, tunnel driver 112 may undo and/or reverse the adjustment to the IP header of packet 50 (unless the firewall rules call for packet 502 to be dropped). Tunnel driver 112 may then push packet 502 further down a network stack 550 of communications protocols on the way toward its destination.

Figure 6:
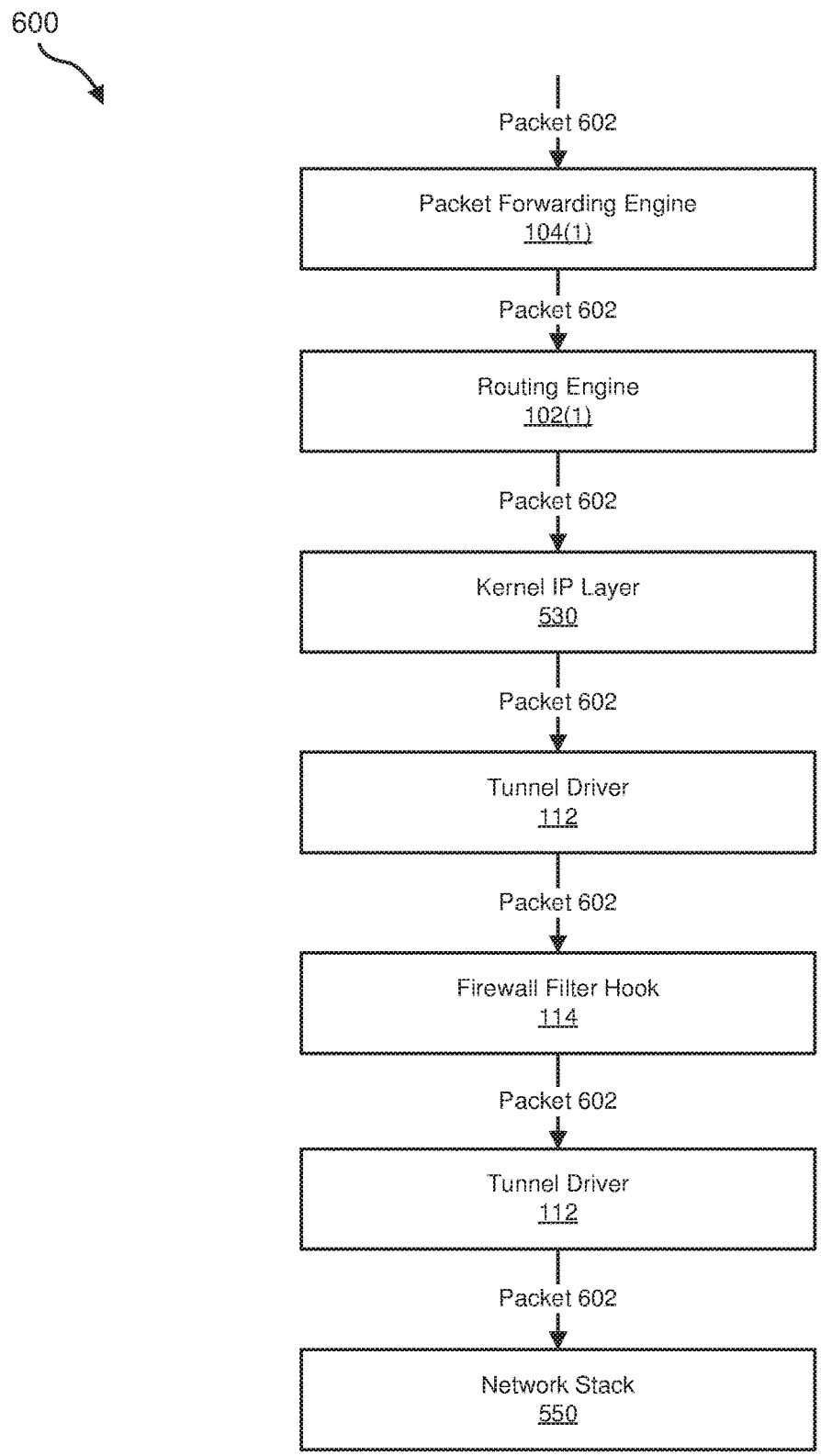
FIG. 6 is an illustration of an exemplary journey of an ingress packet that is subjected to firewall rules in kernel space.

FIG. 6 illustrates an exemplary journey 600 of a packet ingressing into network device 202(1). In this example, a packet 602 may arrive at packet forwarding engine 104(1). Upon receiving packet 602, packet forwarding engine 104(1) may add a tunnel header to packet 602. In this example, the tunnel header may include packet-specific information that identifies the offset of the IP header within packet 602 and/or the packet type of packet 602. Packet forwarding engine 104(1) may then push, pass, and/or forward packet 602 to kernel space on routing engine 102(1) of network device 202(1). In kernel space, packet 602 may arrive at kernel IP layer 530, which fails to properly perform IP firewall filtering on packet 602 due at least in part to the offset and/or packet type.

Packet 602 may then traverse to tunnel driver 112, which searches for the IP header's offset and/or the packet type of packet 602 within the tunnel header. Tunnel driver 112 may then adjust the IP header to account for the offset. Upon completion of the adjustment, tunnel driver 112 may call firewall filter hook 114 to apply the firewall rules on the IP header correctly.

Continuing with this example, tunnel driver 112 may undo and/or reverse the adjustment to the IP header of packet 602 (unless the firewall rules call for packet 602 to be dropped). Tunnel driver 112 may then push packet 602 further up network stack 550 of communications protocols on the way toward its destination.

Figure 7:
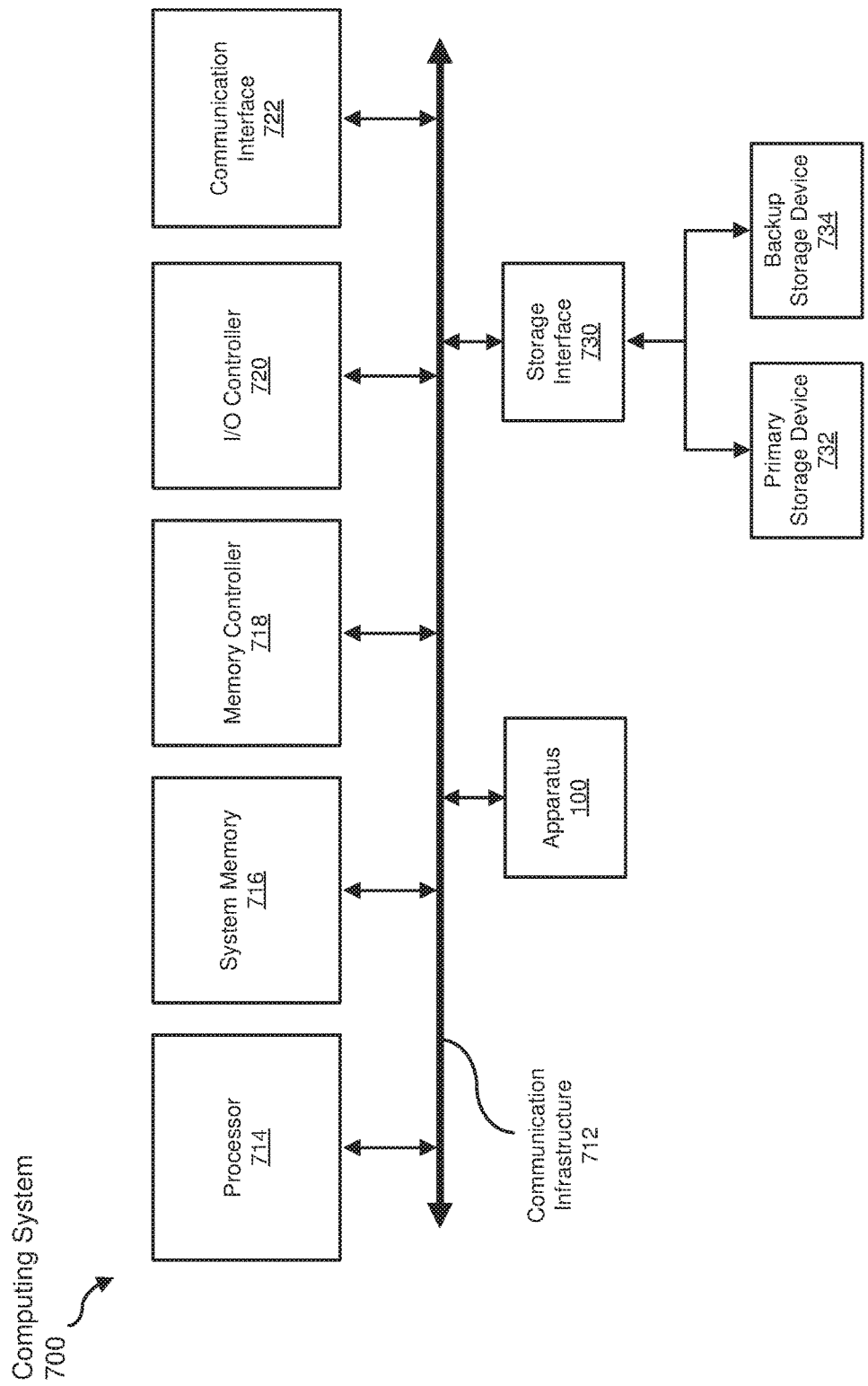
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein. In one example, computing system 700 may include apparatus 100 from FIG. 1.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general-purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   receiving a packet at a tunnel driver in kernel space on a routing engine of a network device;
   identifying, at the tunnel driver, metadata of the packet that indicates whether at least one firewall filter had already been correctly applied to the packet before the packet arrived at the tunnel driver, wherein the metadata of the packet comprises an Internet Protocol (IP) header of the packet;
   determining that the IP header of the packet is offset beyond a certain threshold;
   determining, based at least in part on the IP header of the packet being offset beyond the certain threshold, that the firewall filter had not been correctly applied to the packet before the packet arrived at the tunnel driver; and
   in response to determining that the firewall filter had not been correctly applied to the packet, invoking at least one firewall filter hook that applies at least one firewall rule on the packet in kernel space on the routing engine before the packet is allowed to exit kernel space on the routing engine.

2. The method of claim 1, wherein the packet:
   originated from an application in user space on the routing engine of the network device; and
   is destined for another application on a remote device; and
   further comprising binding the application to the tunnel driver to create a socket that facilitates communication between the application and the other application on the remote device.

3. The method of claim 2, wherein the application is unaware of an offset of the IP header within the packet; and
   further comprising:
   intercepting the packet via a socket-intercept layer in kernel space on the routing engine of the network device;

querying, by the socket-intercept layer, a routing daemon in user space on the routing engine for offset information that identifies the offset of the IP header within the packet;
in response to querying the routing daemon:
obtaining the offset information from the routing daemon; and
recording the offset information as metadata of the packet; and
passing the packet down a network stack of communications protocols in kernel space on the routing engine.

4. The method of claim 3, wherein recording the offset information as metadata of the packet comprises inserting the offset information into a control message header of the packet; and
further comprising:
hooking the packet via at least one kernel-mode hook as the packet traverses the network stack of communications protocols;
copying, via the kernel-mode hook, the offset information from the control message header to a socket buffer field of the packet; and
passing the packet further down the network stack of communications protocols.

5. The method of claim 4, wherein receiving the packet at the tunnel driver comprises receiving the packet at the tunnel driver as the packet is passed further down the network stack of communications protocols from the kernel-mode hook.

6. The method of claim 4, wherein identifying the metadata of the packet that indicates whether the firewall filter had already been correctly applied to the packet comprises:
searching the socket buffer field of the packet for the offset information that identifies the offset of the IP header within the packet; and
identifying the offset information during the search of the socket buffer field.

7. The method of claim 6, wherein determining that the firewall filter had not been correctly applied to the packet before the packet arrived at the tunnel driver comprises at least one of:
determining, based at least in part on the offset information, that the IP header is offset within the packet; and
determining, based at least in part on a packet type of the packet, that the firewall filter had not been correctly applied to the packet before the packet arrived at the tunnel driver; and
further comprising adjusting the IP header within the packet to account for the offset based at least in part on the offset information.

8. The method of claim 7, wherein invoking the firewall filter hook that applies the firewall rule on the packet comprises invoking the firewall filter hook after the IP header has been adjusted to account for the offset such that the firewall filter hook correctly applies the firewall rule on the IP header at the offset.

9. The method of claim 8, wherein applying the firewall rule on the packet in kernel space on the routing engine comprises at least one of:
dropping the packet in kernel space on the routing engine due at least in part to the packet violating the firewall rule; and
preventing the packet from exiting kernel space on the routing engine due at least in part to the packet violating the firewall rule.

10. The method of claim 8, further comprising, after the firewall filter hook has correctly applied the firewall rule on the IP header:
undoing the adjustment to the IP header within the packet; and
pushing the packet from the routing engine to a packet forwarding engine on the network device such that the packet forwarding engine is able to forward the packet from the network device to the remote device.

11. The method of claim 1, wherein the packet:
is destined for an application in user space on the routing engine of the network device; and
originated from another application on a remote device; and
further comprising binding the application to the tunnel driver in kernel space on the routing engine to create a socket that facilitates communication between the application and the other application on the remote device.

12. The method of claim 11, further comprising a packet forwarding engine of the network device that:
receives the packet from the remote device as the packet arrives at the network device; and
stores, within a tunnel header of the packet, packet information that identifies at least one of:
an offset of the IP header within the packet; and
a packet type of the packet; and
forwards the packet to the routing engine of the network device; and
wherein identifying the metadata of the packet that indicates whether the firewall filter had already been correctly applied to the packet comprises:
searching the tunnel header of the packet for the packet information; and
identifying the packet information during the search of the tunnel header.

13. The method of claim 12, wherein determining that the firewall filter had not been correctly applied to the packet before the packet arrived at the tunnel driver comprises determining, based at least in part on the packet information identified in the tunnel header, that the firewall filter had not been correctly applied to the packet before the packet arrived at the tunnel driver; and
further comprising adjusting the IP header within the packet to account for the offset based at least in part on the packet information.

14. The method of claim 13, wherein invoking the firewall filter hook that applies the firewall rule on the packet comprises invoking the firewall filter hook after the IP header has been adjusted to account for the offset such that the firewall filter hook correctly applies the firewall rule on the IP header at the offset.

15. The method of claim 14, wherein applying the firewall rule on the packet in kernel space on the routing engine comprises at least one of:
dropping the packet in kernel space on the routing engine due at least in part to the packet violating the firewall rule; and
preventing the packet from exiting kernel space on the routing engine due at least in part to the packet violating the firewall rule.

16. The method of claim 14, further comprising, after the firewall filter hook has correctly applied the firewall rule on the IP header:
undoing the adjustment to the IP header within the packet; and pushing the packet from kernel space on the routing engine to the application in user space on the routing engine such that the application is able to consume the packet.

17. A physical routing engine of a network device comprising:
    a tunnel driver, stored in kernel space, that:
        receives a packet in kernel space;
        identifies metadata of the packet that indicates whether at least one firewall filter had already been correctly applied to the packet before the packet arrived at the tunnel driver, wherein the metadata of the packet comprises an Internet Protocol (IP) header of the packet;
        determines that the IP header of the packet is offset beyond a certain threshold;
        determines, based at least in part on the IP header of the packet being offset beyond the certain threshold, that the firewall filter had not been correctly applied to the packet before the packet arrived at the tunnel driver; and
        in response to determining that the firewall filter had not been correctly applied to the packet, invokes at least one firewall filter hook that applies at least one firewall rule on the packet in kernel space on the physical routing engine before the packet is allowed to exit kernel space on the physical routing engine; and
    at least one physical processing device that executes the tunnel driver in kernel space.

18. The physical routing engine of claim 17, wherein the packet:
    originated from an application in user space on the physical routing engine of the network device; and
    is destined for another application on a remote device;
    further comprising binding the application to the tunnel driver to create a socket that facilitates communication between the application and the other application on the remote device; and
    wherein the physical processing device executes the application in user space.

19. The physical routing engine of claim 18, wherein the application is unaware of an offset of the IP header within the packet; and
further comprising a socket-intercept layer, stored in kernel space, that:
    intercepts the packet in kernel space;
    queries a routing daemon in user space on the physical routing engine for offset information that identifies the offset of the IP header within the packet;
    in response to querying the routing daemon:
        obtains the offset information from the routing daemon; and
        records the offset information as metadata of the packet; and
        passes the packet down a network stack of communications protocols in kernel space on the physical routing engine; and
wherein the physical processing device executes the socket-intercept layer in kernel space.

20. A network device comprising:
a physical routing engine that comprises a tunnel driver, stored in kernel space, that:
    receives a packet in kernel space;
    identifies metadata of the packet that indicates whether at least one firewall filter had already been correctly applied to the packet before the packet arrived at the tunnel driver, wherein the metadata of the packet comprises an Internet Protocol (IP) header of the packet;
    determines that the IP header of the packet is offset beyond a certain threshold;
    determines, based at least in part on the IP header of the packet being offset beyond the certain threshold, that the firewall filter had not been correctly applied to the packet before the packet arrived at the tunnel driver; and
    in response to determining that the firewall filter had not been correctly applied to the packet, invokes at least one firewall filter hook that applies at least one firewall rule on the packet in kernel space on the physical routing engine before the packet is allowed to exit kernel space on the physical routing engine; and
a physical packet forwarding engine that:
    receives the packet from a remote device; or
    is capable of forwarding the packet to a remote device.

* * * * *